United States Patent
Arrigoni et al.

(10) Patent No.: US 9,856,935 B2
(45) Date of Patent: Jan. 2, 2018

(54) ELECTRO-HYDRAULIC ACTUATOR FOR BRAKE

(71) Applicant: Freni Brembo S.p.A., Curno, Bergamo (IT)

(72) Inventors: Riccardo Arrigoni, Curno (IT); Alessandro Rossi, Curno (IT); Fabio Carbone, Curno (IT); Paolo Sala, Curno (IT); Beniamin Szewczyk, Curno (IT)

(73) Assignee: Freni Brembo S.p.A., Curno (IT)

( * ) Notice: Subject to any disclaimer, the term of this patent is extended or adjusted under 35 U.S.C. 154(b) by 436 days.

(21) Appl. No.: 14/400,142

(22) PCT Filed: May 9, 2013

(86) PCT No.: PCT/IB2013/053760
§ 371 (c)(1),
(2) Date: Nov. 10, 2014

(87) PCT Pub. No.: WO2013/168122
PCT Pub. Date: Nov. 14, 2013

(65) Prior Publication Data
US 2015/0114770 A1    Apr. 30, 2015

(30) Foreign Application Priority Data

May 11, 2012  (IT) .............................. MI2012A0812

(51) Int. Cl.
*F16D 63/00*      (2006.01)
*F16D 65/14*      (2006.01)
(Continued)

(52) U.S. Cl.
CPC ............ *F16D 65/14* (2013.01); *B60T 13/745* (2013.01); *F16D 2121/04* (2013.01);
(Continued)

(58) Field of Classification Search
CPC ............ F16D 2121/24; F16D 2125/40; F16D 2125/48; F16D 2125/52; F16D 65/563;
(Continued)

(56) References Cited

U.S. PATENT DOCUMENTS 4,852,419 A * 8/1989 Kittel ...................... F16D 28/00
                                                            192/84.6
5,678,673 A * 10/1997 Borschert ............... F16D 28/00
                                                            192/109 R
(Continued)

FOREIGN PATENT DOCUMENTS

DE         43 12 524 A1      10/1994
DE         4433826 A1 *       3/1996 ............. F16D 23/12
(Continued)

*Primary Examiner* — Anna Momper
*Assistant Examiner* — Mahbubur Rashid
(74) *Attorney, Agent, or Firm* — Blank Rome LLP

(57) ABSTRACT

An electro-hydraulic actuator (1) for actuating a brake (2) with a hydraulic thrust unit comprises an electric motor (3), a converting mechanism (5) to convert a rotational motion of the motor (4) into a translational motion, a cylinder (8), and a piston (9) connected to the converting mechanism, wherein the converting mechanism (5) is configured so that, for a given angular speed of the drive shaft (4), the translation speed of the piston (9) decreases from a maximum value in a rear length (14) of the piston stroke to a minimum value in a front length (13) of the piston stroke.

13 Claims, 7 Drawing Sheets

(51) Int. Cl.
  *B60T 13/74*      (2006.01)
  *F16D 125/26*    (2012.01)
  *F16D 125/28*    (2012.01)
  *F16D 125/40*    (2012.01)
  *F16D 125/48*    (2012.01)
  *F16D 125/58*    (2012.01)
  *F16D 121/04*    (2012.01)
  *F16D 121/24*    (2012.01)

(52) U.S. Cl.
  CPC ...... *F16D 2121/24* (2013.01); *F16D 2125/26* (2013.01); *F16D 2125/28* (2013.01); *F16D 2125/405* (2013.01); *F16D 2125/48* (2013.01); *F16D 2125/587* (2013.01)

(58) Field of Classification Search
  CPC ........... F16D 2125/06; F16D 2065/386; B60T 13/745
  USPC ...................................... 188/106 F
  See application file for complete search history.

(56) References Cited

U.S. PATENT DOCUMENTS

| | | | | |
|---|---|---|---|---|
| 6,763,922 B2 * | 7/2004 | Katou | ............... | F16D 29/005 |
| | | | | 192/84.6 |
| 6,823,754 B2 * | 11/2004 | Boll | ............... | F16D 48/066 |
| | | | | 192/84.6 |
| 7,451,864 B2 * | 11/2008 | Kosugi | ............... | F16D 28/00 |
| | | | | 192/83 |
| 8,051,965 B2 * | 11/2011 | Kim | ............... | F16D 28/00 |
| | | | | 192/20 |
| 2005/0006187 A1 | 1/2005 | Kramer et al. | | |
| 2013/0086898 A1 * | 4/2013 | Yang | ............... | B60T 1/10 |
| | | | | 60/413 |

FOREIGN PATENT DOCUMENTS

| | | | | |
|---|---|---|---|---|
| DE | 19525840 C1 * | 11/1996 | ........... | F16D 13/752 |
| DE | 197 28 82 A1 | 1/1999 | | |
| DE | 19742477 C2 * | 9/2002 | ............. | F16D 23/12 |
| DE | 4138625 B4 * | 7/2010 | ............. | H02K 7/116 |
| DE | 10 2009 031 919 A1 | 1/2011 | | |
| EP | 0802344 A2 * | 10/1997 | ........... | F16D 29/005 |
| EP | 0928903 A1 * | 7/1999 | ............. | F16D 29/00 |
| EP | 1985879 A1 * | 10/2008 | ............. | F16D 23/12 |
| FR | 2611615 A1 * | 9/1988 | ............. | F16D 28/00 |
| WO | WO 9831948 A1 * | 7/1998 | ............. | F16D 28/00 |

* cited by examiner $$x = R - R\cos(\theta) + L - L\cos(\varphi)$$

$$x = R - R\cos(\theta) + L - \sqrt{L^2 - [R\sin(\theta)]^2}$$

ELECTRO-HYDRAULIC ACTUATOR FOR BRAKE

It is the object of the present invention an electro-hydraulic actuator for a brake, in particular for a disc brake with a hydraulic cylinder-piston thrust unit for motor vehicles, motor cycles, and commercial and industrial vehicles.

From U.S. Pat. No. 6,623,087 and DE19527936, braking systems for motor vehicles of the BBW type ("Brake By Wire") are known, in which a linear transducer connected to a brake pedal detects the stroke of the brake pedal and transmits an electrical signal indicative for the request of braking torque by the user to a control unit. The control unit processes the signals of the transducer and controls an electric motor of a hydraulic pump as a function of the required braking torque. The hydraulic pump actuated by the electric motor pressurizes and conveys a hydraulic fluid to the hydraulic pressure units of the vehicle brakes.

Compared to the conventional braking systems, in which the brake pedal directly acts on the hydraulic circuit, the advantages of the "Brake By Wire" systems is that they allow generating and controlling the braking system hydraulic pressure without the aid of the force applied through the brake pedal. Furthermore, the at least partial replacement of the hydraulic circuits by electric circuits allows saving hydraulic fluid, reducing weight, and reducing the environmental impact of the braking system. Finally, the management of the braking system by an electronic control unit based on electric signals representing the required braking torque, allows a more ergonomic designing of the brake pedal or the brake lever, and a response of the braking system that is more targeted and differentiated according to the road conditions and the vehicle conditions upon braking, in addition to the possibility of performing a regenerative braking action (with an at least partial recovery of the kinetic energy) and blending.

In spite of the several advantages of the "Brake By Wire" systems, under extreme braking conditions, for example, in the case of an abrupt efficiency loss of the brake (the so-called "fading") following an overheating after prolonged and deep braking actions, the brake requires very high hydraulic pressures, which translate into an oversizing of the pump electric motor, which otherwise would risk to be burned. Such oversizing of the electric motor does not lead to any advantages in 99% of operative situations of the braking system, yet involving additional manufacturing and operative costs, as well as a high weight and high overall dimensions.

Therefore, the object of the present invention is to provide an electro-hydraulic actuator for a hydraulic brake, having such characteristics as to obviate the drawbacks set forth with reference to the prior art.

A particular object of the invention is to propose an electro-hydraulic actuator for a hydraulic brake, in which an electric motor of the electro-hydraulic actuator is dimensioned for the standard operative conditions of the brake, and in which the electro-hydraulic actuator is configured to be able to generate, under extreme conditions, by the same electric motor, an exceptionally high fluid pressure without the risk of overheating the motor.

These and other object are achieved by an electro-hydraulic actuator for actuating a brake having a hydraulic thrust unit, said actuator comprising:

an electric motor with a drive shaft,
a converting mechanism connected with the drive shaft and adapted to convert a rotational motion of the drive shaft into a translational motion of a translatable portion,
a hydraulic pump connected to the converting mechanism and adapted to carry out, in response to the translational movement, an increase in a hydraulic liquid pressure, in which the hydraulic pump comprises:
a cylinder and a piston received in the cylinder and constrained to the translatable portion so as to translate together with it with respect to the cylinder along a piston stroke extending from a rear end of stroke to a front end of stroke, said piston stroke comprising:
a front length including the front end of stroke and having a length less than or equal to half the length of the piston stroke, and
a rear length including the rear end of stroke and having a length less than or equal to half the length of the piston stroke,
a pressure chamber defined by the cylinder and the piston and having a volume that varies as a function of the position of the piston from a maximum volume when the piston is at the rear end of stroke position to a minimum volume when the piston is at the front end of stroke position,
a supply duct in communication with the pressure chamber, and adapted to be connected with the hydraulic thrust unit of the brake,
in which the converting mechanism is configured so that, for a given angular speed of the drive shaft, the translation speed of the translatable portion decreases from a maximum value in a position of the piston at the rear length to a minimum value in a position of the piston at the front length.

This reduces the motor torque and thus the electric power supply required to generate a high fluid pressure in the front length of the piston stroke, thus obviating the risk of overheating the electric motor in extreme braking situations. At the same time, when the piston is in the rear length of the piston stroke (situation of standard operative braking actions), the actuator allows an operation of the electric motor in a motor torque capacity and absorbed power supply suitable for the dimensioning of the motor.

Furthermore, by virtue of the fact that the minimum value of the transmission and conversion ratio (or, in other words: the minimum value of the quotient between the linear translation speed of the translatable portion and the angular speed of the drive shaft) is reached when the piston is in the front length of the piston stroke, it is possible to generate very high fluid pressures under high fluid shift conditions outside the cylinder.

In accordance with an aspect of the invention, the front length of the piston stroke has a length less than one third of the length of the piston stroke, preferably less than one fourth of the length of the piston stroke. Still more preferably, the minimum value of the transmission and conversion ratio (or, in other words: the minimum value of the quotient between the linear translation speed of the translatable portion and the angular speed of the drive shaft) is reached when the piston is at the front end of stroke.

In accordance with a further aspect of the invention, the maximum value of the transmission and conversion ratio (or, in other words: the maximum value of the quotient between the linear translation speed of the translatable portion and the angular speed of the drive shaft) is reached when the piston is at the rear end of stroke.

In accordance with a further aspect of the invention, the converting mechanism comprises a crank and connecting rod mechanism for a conversion of the rotational motion of the drive shaft into the translational motion of the translatable portion. In the crank and connecting rod mechanisms, the translation speed of the translatable portion is a non-linear function of the angular position of the crank and also of the stroke of the translatable portion. Considering now that the fluid pressure is approximately a linear function of the piston stroke, and by combining such linear function of the pressure with the non-linear function of the translation speed of the piston, a non-linear ratio between the motor torque and the stroke of the piston is obtained, in which, in a prevailing portion of the rear length (in the first half) of the piston stroke, the motor torque increases in an approximately proportional (linear) manner as the piston advances, and in the front length (in the second half) of the piston stroke, the motor torque increases in a sub-proportional (or decreasing) manner, or it decreases as the piston advances. Just this characteristic allows an optimal operation of the electric motor and a precise control of the fluid pressure under normal braking conditions (with the piston at the rear length of the piston stroke) and a very high pressurization of the fluid under exceptional braking conditions (with the piston at the front length of the piston stroke).

In accordance with a further aspect of the invention, the converting mechanism comprises a cam mechanism for a conversion of the rotational motion of the drive shaft into the translational motion of the translatable portion. In such a case, the cam surface has a shape and a radial distance to its rotation fulcrum such as to obtain the above-mentioned relationship between the translation speed of the piston and the angular speed of the drive shaft and, preferably, a non-linear ratio between the motor torque and the piston stroke, in which, in a prevailing portion of the rear length (in the first half) of the piston stroke, the motor torque increases in an approximately proportional (linear) manner as the piston advances, and in the front length (in the second half) of the piston stroke, the motor torque increases in a sub-proportional (or decreasing) manner, or it decreases as the piston advances.

In accordance with a further aspect of the invention, the converting mechanism comprises a rotor coupled with a stator by the engagement between volving members connected to one of them, and a helicoidal track formed in the other one, in which the angle of the coil of the helicoidal track varies along the length thereof, so as to obtain the above-mentioned relationship between the translation speed of the piston and the angular speed of the drive shaft and, preferably, a non-linear ratio between the motor torque and the piston stroke, in which, in a prevailing portion of the rear length (in the first half) of the piston stroke, the motor torque increases in an approximately proportional (linear) manner as the piston advances, and in the front length (in the second half) of the piston stroke, the motor torque increases in a sub-proportional (or decreasing) manner, or it decreases as the piston advances.

In order to better understand the invention and to appreciate the advantages thereof, some exemplary, non-limiting embodiments thereof will be described herein below, with reference to the appended Figures, in which.

Figure 12:
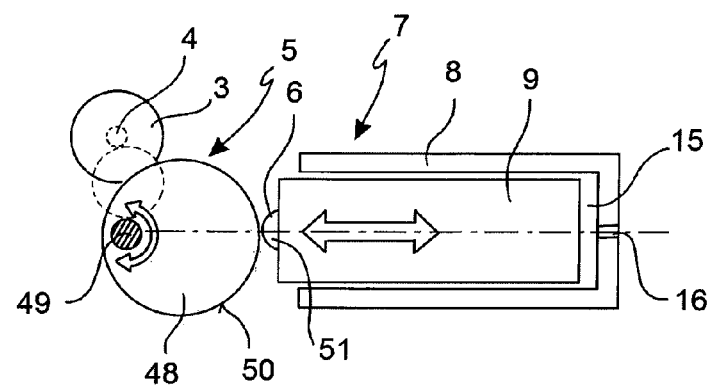
Figure 13:
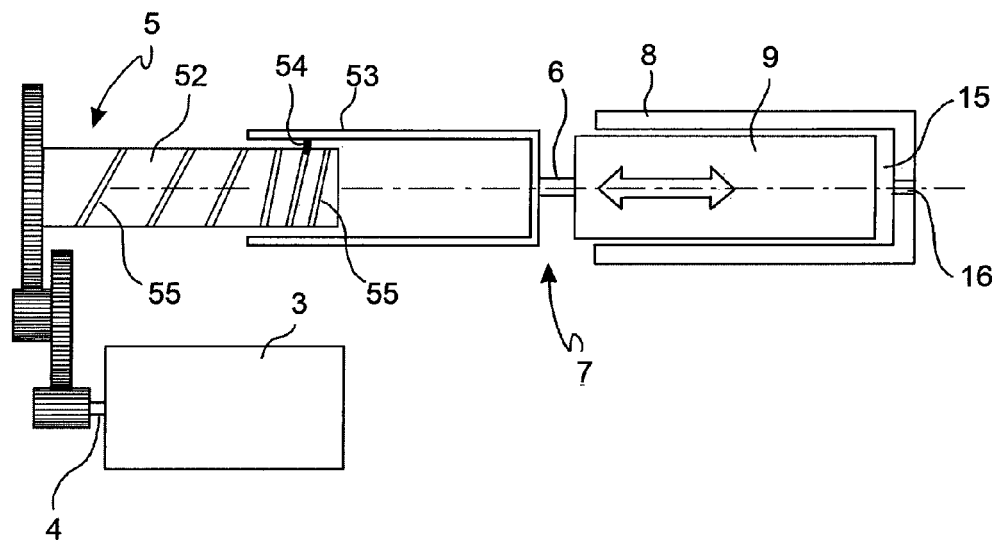

FIGS. 12 and 13 schematically show electro-hydraulic actuators according to further embodiments.

With reference to the Figures, an electro-hydraulic actuator is generally indicated with the reference 1. The actuator 1 is provided for actuating a brake 2 with a hydraulic thrust unit and comprises an electric motor 3 with a drive shaft 4, a converting mechanism 5 connected with the drive shaft 4 and adapted to convert a rotational motion of the drive shaft 4 into a translational motion of a translatable portion 6, as well as a hydraulic pump 7 connected to the converting mechanism 5 and adapted to generate, in response to the translational movement, an increase in pressure of a hydraulic liquid.

The hydraulic pump 7 comprises a cylinder 8 and a piston 9 received in the cylinder 8 and constrained to the translatable portion 6 so as to translate together with it with respect to the cylinder 8 along a piston stroke 10 extending from a rear end of stroke 11 to a front end of stroke 12. The piston stroke 10 comprises a front length 13 including the front end of stroke 12 and having a length less than or equal to half the length of the piston stroke 10, and a rear length 14 including the rear end of stroke 11 and having a length less than or equal to half the length of the piston stroke 10.

The hydraulic pump 7 further comprises a pressure chamber 15 defined by the cylinder 8 and the piston 9 and having a volume that varies as a function of the position of the piston 9 from a maximum volume when the piston 9 is at the rear end of stroke position 11 to a minimum volume when the piston 9 is at the front end of stroke position 12. The pressure chamber 15 is in communication with a supply duct 16, which is preferably formed in the cylinder 8 (but it could also be formed in the piston 9) and adapted to be connected with the hydraulic thrust unit of the brake 2.

According to an aspect of the invention, the converting mechanism 5 is configured so that, for a given angular speed of the drive shaft 4, the translation speed of the translatable portion 6 (i.e., of the piston 9) decreases from a maximum value in a position of the piston 9 in the rear length 14 to a minimum value in a position of the piston 9 in the front length 13.

This reduces the motor torque and thus the power supply required to generate a high fluid pressure in the front length 13 of the piston stroke 10, thus obviating the risk of overheating the electric motor 3 under extreme braking situations. At the same time, when the piston 9 is in the rear length 14 of the piston stroke 10 (situation of standard operative braking actions), the actuator 1 allows an operation of the electric motor 3 in a motor torque capacity and absorbed power supply that is suitable for the dimensioning of the same motor.

Furthermore, by virtue of the fact that the minimum value of the transmission and conversion ratio $V_{LIN,9}/V_{ANG,4}$ (or, in other words: the minimum value of the quotient between the linear translation speed of the translatable portion 6 (or piston 9) and the angular speed of the drive shaft 4) is reached when the piston is in the front length 13 of the piston stroke 10, it is possible to generate very high fluid pressures when the fluid itself has already undergone a high shift. In this manner, a rapid approach and engagement of the pads against the brake disc under normal braking conditions (rear length of the piston stroke) is obtained, and very high pressures can be generated when the pads have already engaged the brake disc and do not require further substantial shifts.

Furthermore, the converting mechanism 5 is configured so as to ensure also a controlled backward movement of the piston 9 from the front end of stroke (12) position to the rear end of stroke (11) position, as a response of a retro-movement of the motor 3. Such reversibility of the motion is indispensable for the braking systems at issue.

According to an embodiment, the front length 13 of the piston stroke 10 has a length less than one third, preferably less than one fourth, of the length of the piston stroke 10. Still more preferably, the minimum value of the transmission and conversion ratio $V_{LIN,9}/V_{ANG,4}$ (or, in other words: the minimum value of the quotient between the linear translation speed of the translatable portion 6 (piston 9) and the angular speed of the drive shaft 4) is reached when the piston 9 is at the front end of stroke 12.

The maximum value of the transmission and conversion ratio $V_{LIN,9}/V_{ANG,4}$ (or, in other words: the maximum value of the quotient between the linear translation speed of the translatable portion 6 (piston 9) and the angular speed of the drive shaft 4) is preferably reached when the piston is at the rear end of stroke 11.

Figure 10:
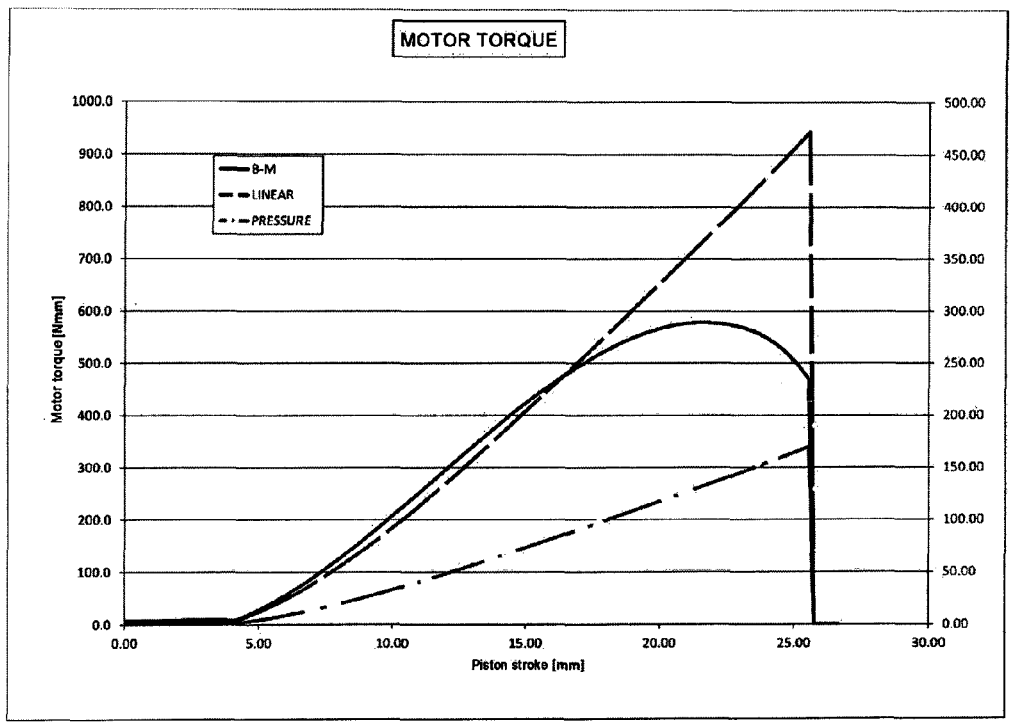
FIG. 10 shows a diagram indicating the trend of the motor torque and of the fluid hydraulic pressure as a function of the piston stroke in accordance with an embodiment of the invention compared to a solution of the prior art.

According to a preferred embodiment, the converting mechanism 5 comprises a crank 17 and connecting rod 18 mechanism for a conversion of the rotational motion of the drive shaft 4 into the translational motion of the translatable portion 6 (piston 9). In the crank and connecting rod mechanisms, the translation speed of the translatable portion 6 $V_{LIN,9}$ is a non-linear function of the angular position of the crank and also of the stroke of the translatable portion 6. Considering now that the fluid pressure is approximately a linear function of the stroke of the piston 9 (i.e., the position of the piston 9 along the piston stroke 10) and by combining such linear function of the pressure of the fluid with the non-linear function of the translation speed of the piston, a non-linear ratio between the motor torque and the stroke of the piston 9 is obtained, in which, in a prevailing portion of the rear length 14 (in the first half) of the piston stroke 10, the motor torque increases in an approximately proportional (linear) manner as the piston advances 9, and in the front length 13 (in the second half) of the piston stroke 10, the motor torque increases in a sub-proportional (or decreasing) manner, or it decreases as the piston advances 9, as indicated by the continuous curve in the diagram in FIG. 10. Just this characteristic of the converting mechanism 5 allows an optimal operation of the electric motor 3 and a precise control of the fluid pressure under normal braking conditions (with the piston 9 in the rear length 14 of the piston stroke 10) and a very high pressurization of the fluid under exceptional braking conditions (with the piston 9 in the front length 13 of the piston stroke 10).

Since at least some of the above-mentioned advantages of the so-configured converting mechanism 5 can be obtained by alternative kinematics, some of which will be described by way of exemplary, non-limiting example only herein below, an aspect of the invention also relates to the general technical concept whereby, in a prevailing portion of the rear length 14 (in the first half) of the piston stroke 10, the motor torque increases in an approximately proportional (linear) manner as the piston advances 9, and in the front length 13 (in the second half) of the piston stroke 10, the motor torque increases in a sub-proportional (or decreasing) manner, or it decreases as the piston advances 9 in the direction of the front end of stroke 12. The concept of a "sub-proportional" trend of mathematical functions is sometimes also referred to by the term "sub-linear".

In accordance with an embodiment, the actuator comprises a housing 19 receiving the converting mechanism 5 and supporting or receiving the electric motor 3, the cylinder 8, as well as a reservoir 20 for the pressurized fluid.

The converting mechanism 5 may comprise an (optional) reduction unit 22 to demultiply the rotational motion of the drive shaft 4 and a converting unit 30 to convert the rotational motion into a translational motion. Furthermore, first transmission means 21 of the rotational motion of the drive shaft 4 to the reduction unit (preferably epicycloidal) and second transmission means 23 of the rotational motion of the reduction unit to the converting unit 30 can be provided.

According to an embodiment, the first transmission means 21 comprise a connecting portion formed on the end of the drive shaft 4 and having an outer toothing meshing with satellite toothed wheels 24 of a first train of satellites of the epicycloidal reduction unit 22, so that the drive shaft 4 forms the central pinion of a first reduction stage of the epicycloidal reduction unit 22. The epicycloidal reduction unit 22 preferably comprises two reduction stages, the first reduction stage of which includes the above-mentioned central pinion formed by the end of the drive shaft 4, an outer crown 25 with internal toothing locked in rotation and the above-mentioned first train of satellite toothed wheels 24 meshing with both the drive shaft 4 and the crown 25. The first satellite toothed wheels 24 are supported by a first satellite bearing plate 26 which, in turn, comprises a toothed central portion 27 composing a central pinion (planet) of a second reduction stage.

Such second reduction stage comprises, in addition to the second central pinion (planet) formed by the toothed central portion 27 of the first satellite bearing plate 26, the same toothed crown 25 and a second train of satellite toothed wheels 28 meshing with both the second central pinion 27 and the crown 25.

The second satellite toothed wheels 28 are supported by a second satellite bearing plate 29 implementing the connection with the converting unit 30.

The toothed crown 25 can be manufactured as a distinct part from the housing 19 and subsequently inserted therein. This allows optimizing the thicknesses and the materials of the toothed crown 25 and the housing 19 independently from one another to reduce the weight and manufacturing cost of the actuator 1. In particular, the housing 19 could be manufactured in a material different from that of the toothed crown, for example, in a plastic material or by die casting in an aluminium/magnesium alloy.

By way of non-limiting example, the housing 19 can be in plastic material injection moulded over the toothed crown 25 in metallic material, for example, steel, reducing the tolerances and assembling costs of the actuator 1.

The electric motor 3 may comprise a front flange 31 connectable to the housing 19, for example, by means of screws insertable in holes obtained in the front flange 31 and that can be screwed in two internally threaded holes of the housing 19. The front flange 31 may comprise centering means, for example, engaging seats or surfaces, adapted to engage the toothed crown 25 so as to position and center it with respect to the drive shaft 4. In this manner, an expensive precision mechanical machining of a plurality of inner surfaces of the housing 19 is obviated. The front flange 31 of the electric motor 3 could form also one or more protuberances to lock in rotation the toothed crown 25. Alternatively, the means to lock the toothed crown 25 in rotation (e.g., of the recess-tooth, or the recess-key type) are formed and act between the toothed crown 25 and the housing 19.

The second satellite bearing plate 29 comprises a shaft portion 34 for the transmission of the rotational motion in output from the epicycloidal reduction unit (and precisely of the rotational motion of the second satellite bearing plate 29) to the converting unit 30. The shaft portion 34 is connected to the housing 19 and centered by a first volving radial bearing 32 (ball-bearing, reducer side) and a second plain radial bearing 32' (converting unit side) received in corresponding seats 33, 33' of the housing 19.

Figure 3:
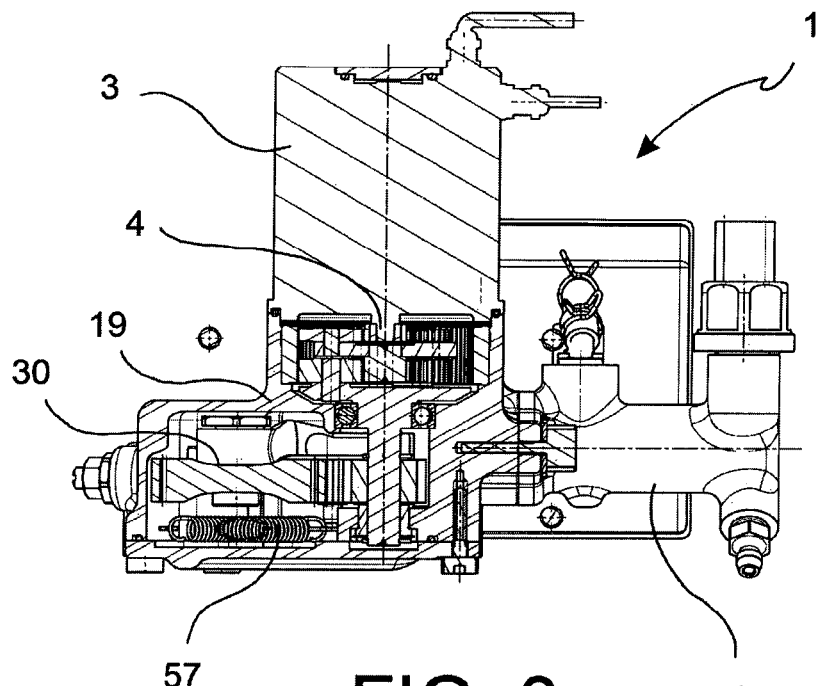
FIG. 3 is a sectional view of the actuator 20 in FIG. 1.
Figure 4:
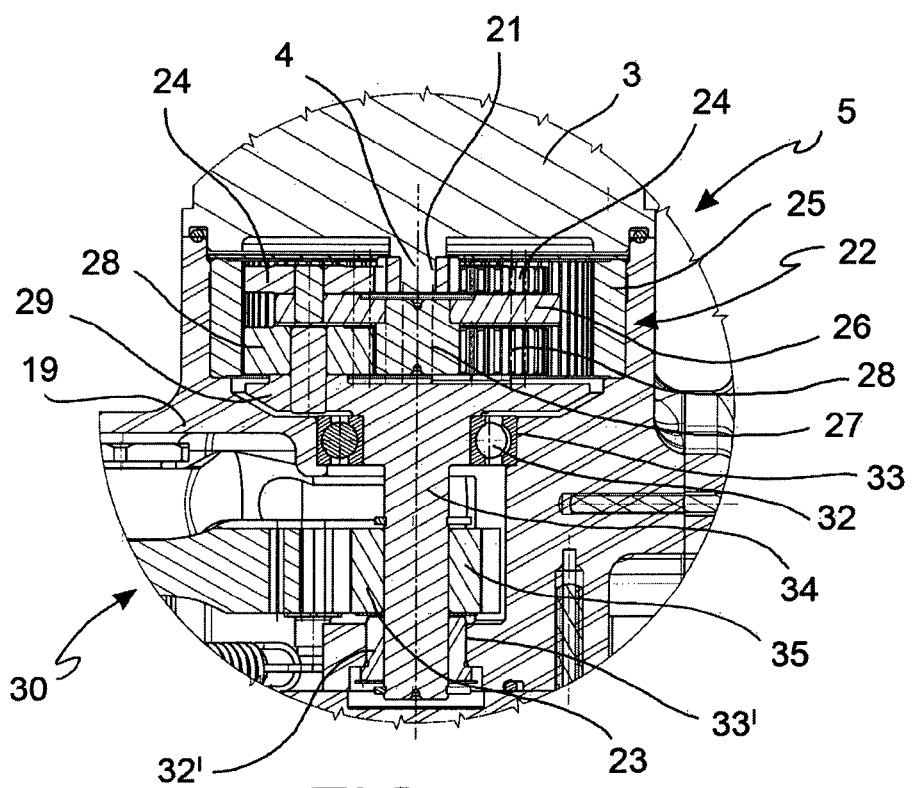
FIG. 4 is an enlarged view of a detail in FIG. 3.
Figure 5:
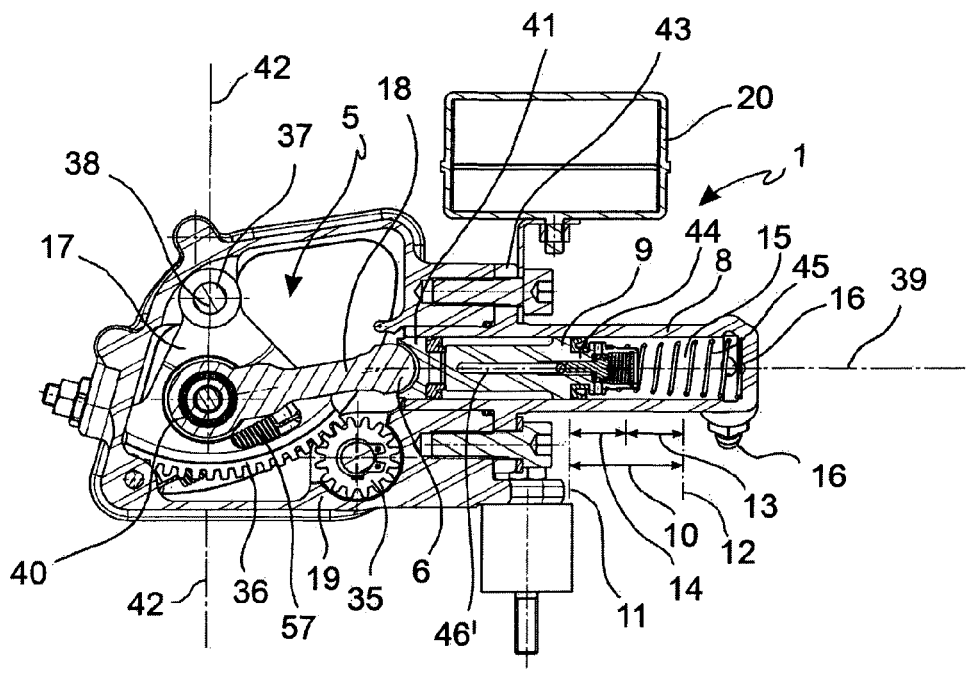
FIG. 5 is a sectional view of the actuator with a piston in a rear end of stroke position.

The shaft portion 34 engages the crank 17 of the crank 17-connecting rod 18 mechanism, so as to be able to apply a torque to the crank 17 and to make it rotate (FIGS. 3, 4, 5).

Figure 9:
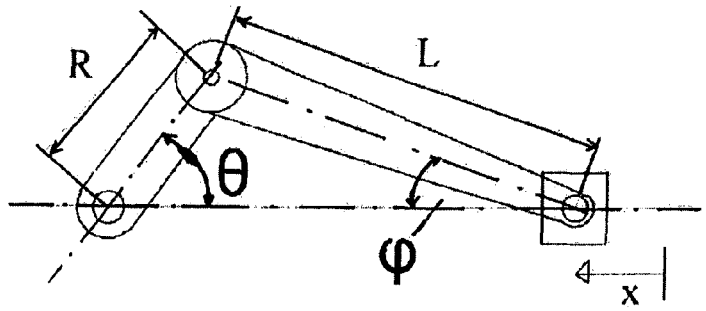
FIG. 9 is a schematic illustration of a crank and connecting rod mechanism and of the kinematical law ruling the behaviour thereof.

The crank 17 itself is connected to the housing 19, preferably by a roller bearing 37 (for example, a roll- or needle-bearing), so as to be able to rotate around a crank fulcrum or axis 38 transversal, preferably perpendicular, to the translation direction 39 of the piston 9. The connecting rod 18 has a preferably elongate shape, with a first end 40 hinged to the crank 17 in an eccentric point (at a radius R, see FIGS. 6 and 9) with respect to the crank fulcrum 38, and a second end forming the translatable portion 6 and permanently engaging a rear portion 41 of the piston 9.

The shaft portion 34 can form or support a toothed wheel or pinion 35 meshing with a toothed sector 36 of a crank 37. When, as illustrated in the Figures, the toothed sector 36 has a radius 5 greater than that of the pinion 35, the rotation of the shaft portion 34 not only rotates the crank 17 around the crank fulcrum 38, but also demultiplies the rotational speed thereof.

Figure 6:
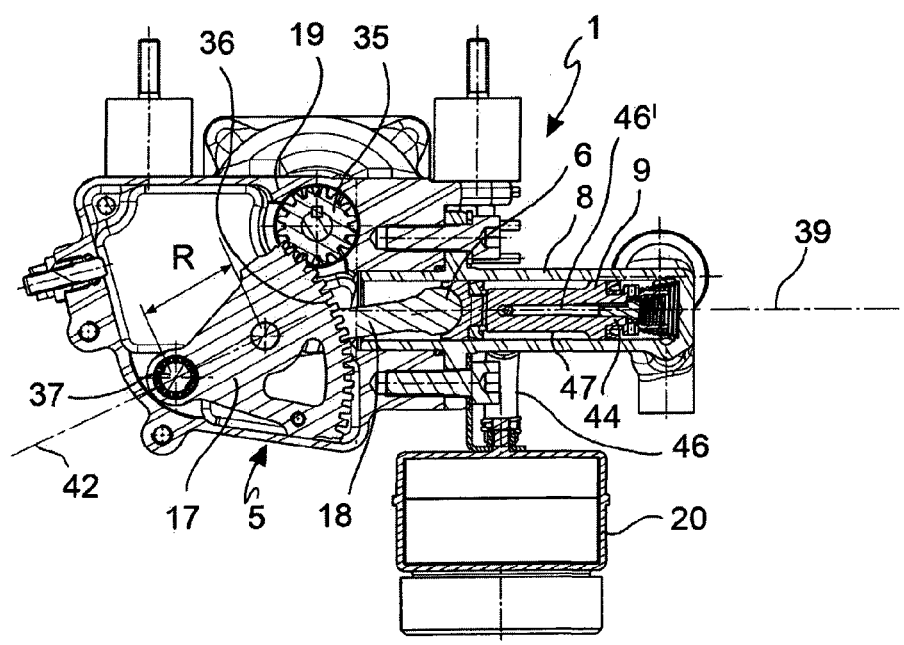
FIG. 6 is a sectional view of the actuator with a piston in a front end of stroke position.
Figure 7:
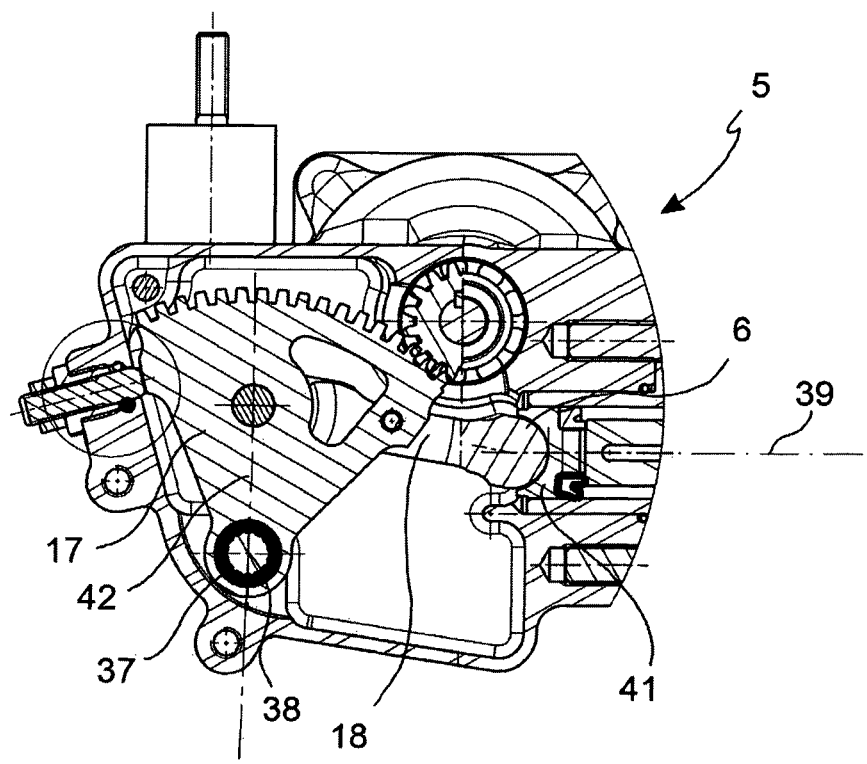
FIG. 7 is an enlarged view of a detail of the actuator according to an embodiment.
Figure 8:
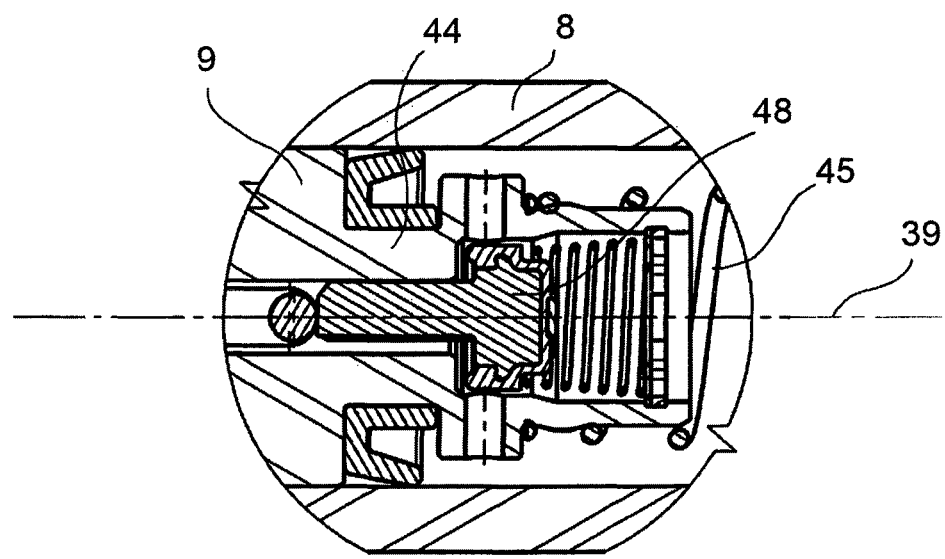
FIG. 8 is an enlarged view of a further detail of the actuator according to an embodiment.

As it can be noticed in FIGS. 5 and 6, with the piston 9 at the rear end of stroke 11 position (FIG. 5), the rotational angle of the crank 17 Theta ($\theta$) defined as the angle between the translation axis 39 of the piston 9 and the plane 42 defined by the crank axis 38 and the hinge axis of the first end 40 of the connecting rod 18, is maximum (and preferably ranging from 75° to 110°, still more preferably from 80° to 100°, and still more preferably from 84° to) 92°. With the piston at the position of front end of stroke 12 (FIG. 6), such rotational angle of the crank 17 Theta ($\theta$) is minimum (and preferably ranging from 3° to 35°, still more preferably from 15° to 30°, and still more preferably da 22° a 28°).

In order to obtain that in a prevailing portion of the rear length 14 (in the first half) of the piston stroke 10 the motor torque increase in an approximately proportional (linear) manner with the advancement stroke of the piston 9, and in the front length 13 (in the second half) of the piston stroke 10, the motor torque increases in a sub-linear (or decreasing) manner, or it decreases as the piston advances 9 in direction of the front end of stroke 12, and to be able to set the desired trends of the motor torque in the approximately linear phase and in the sub-linear phase, it can be advantageous to arrange the crank axis 38 at a perpendicular distance from the translation axis 39 of the piston 9. Such perpendicular distance is preferably less than the distance between the crank axis 38 and the hinge axis of the first end 40 of the connecting rod 18 (radius R in FIG. 5). Furthermore, such perpendicular distance preferably ranges from 0.4L to 0.6L, where L is the distance between the first and the second ends of the connecting rod 18 (length connecting rod L).

One or more return elastic springs 57 connected between the crank 17 and the housing 19 ensure an automatic return of the crank 17 and of the piston 9 to the rear end of stroke position 11 (position of FIG. 5) in the case of a failure or operative stop of the electric motor.

Figure 1:
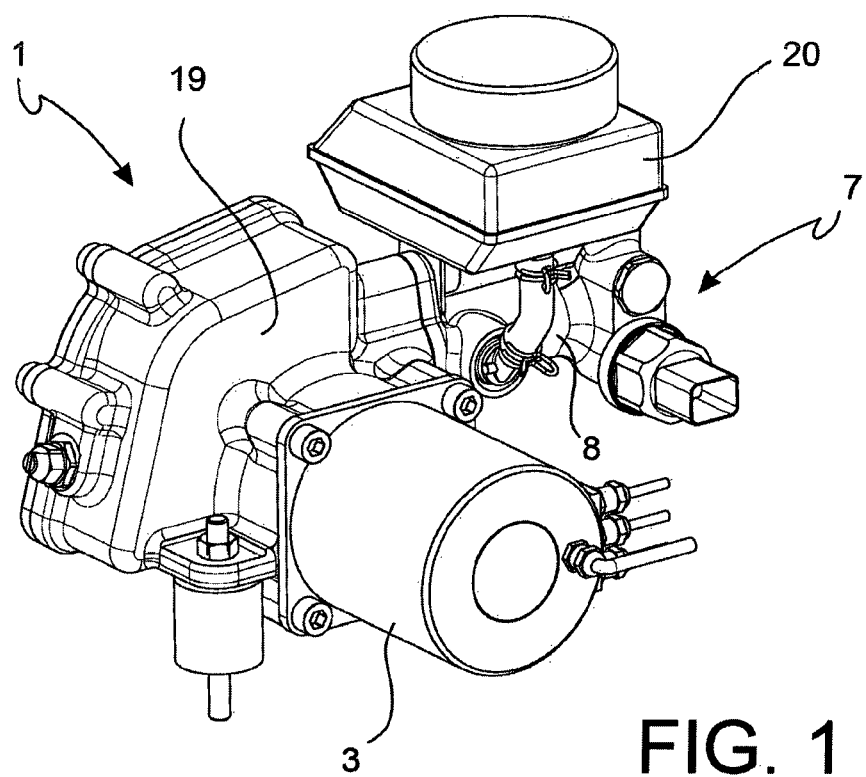
FIGS. 1 and 2 are perspective views of an electro-hydraulic actuator for hydraulic brakes according to an embodiment of the invention.
Figure 2:
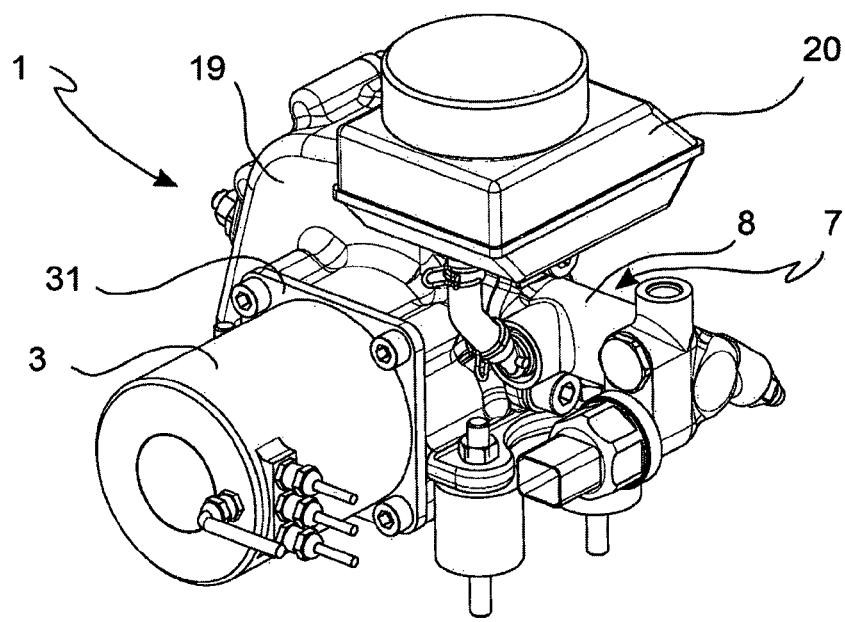

The cylinder 8 may comprise a connecting flange 43 connectable to the housing 19, for example, by means of screws insertable in holes obtained in the connecting flange 43 and that can be screwed in two internally threaded holes of the housing 19 (FIGS. 2, 5). Alternatively, the cylinder 8 can be directly formed by the housing 19, or manufactured separately and subsequently inserted in a cylinder seat of the housing 19.

The piston 9 is slidably received in the cylinder 10 by the interposition of a first gasket in the proximity of a front portion 44 thereof and of a second gasket in the proximity of the rear portion 41 thereof. The rear portion 41 of the piston 9 has a rounded cavity receiving in pressing contact and rotatably the second end (translatable portion 6) of the connecting rod 18. Such pressing contact between the rear portion 41 of the piston 9 and the connecting rod 18 is ensured by a return spring 45 arranged with elastic pre-load in the pressure chamber 15 between a bottom wall of the cylinder 8 and the front portion 44 of the piston, so as to bias the piston 9 permanently elastically towards the position of rear end of stroke 11.

The supply duct 16 is formed in a side wall of the cylinder 10. Furthermore, a suction duct 46 is provided, which puts the pressure chamber 15 in communication with the reservoir 20 of the pressurized fluid. Such suction duct 46, 46' can be formed in the cylinder 8 and/or in the piston 9. In the embodiment illustrated in the Figures, a side surface of the piston 9 forms a (preferably circumferential) cavity 47 defining, together with the side wall of the cylinder 8 a (preferably annular) suction chamber. A first portion 46 of the suction duct extends from the reservoir 20 through the side wall of the cylinder 8 and opens to the cylinder side in the suction chamber, and a second portion 46' of the suction duct is provided with a valve 48 and extends from an opening in the front portion 44 of the piston 9 through the piston up to the cavity 47. Such valve 48 allows a free communication between the pressure chamber 15 and the reservoir 20 with the piston at the rear end of stroke position, while preventing the fluid passage (in both directions) when the piston exceeds a given initial distance (idle stroke) from the rear end of stroke, thus allowing a pressurization of the pressure chamber 15 and a thrust of the fluid towards the thrust unit of the brake.

For the control of the electro-hydraulic actuator 1:
- a control unit 58 to control the supply of the electric motor 3,
- a drive member 60, for example, a lever or a pedal,
- a drive sensor 62, for example, a linear or rotating (potentiometric or magnetostrictive) transducer, connected to the drive member 60 and in signal communication with the control unit 58, such drive sensor 60 being configured to generate a required braking torque signal as a function of a shift of the drive member 60 and to transmit the required braking torque signal to the control unit, a pressure sensor 59 connected to the pressure chamber 15 and in signal communication with the electronic control unit 58, such pressure sensor 59 being configured to generate a pressure signal as a function of the fluid pressure in the pressure chamber 15 and to transmit the pressure signal to the control unit, may be provided in which the control unit 58 is configured to receive and process the pressure signal and the required braking torque signal and to control the power supply of the motor 3 as a function of the required braking torque and the detected fluid pressure.

The present invention also relates to the single brake 2, which comprises the electro-hydraulic actuator 1 for the supply of the hydraulic thrust unit thereof.

Figure 11:
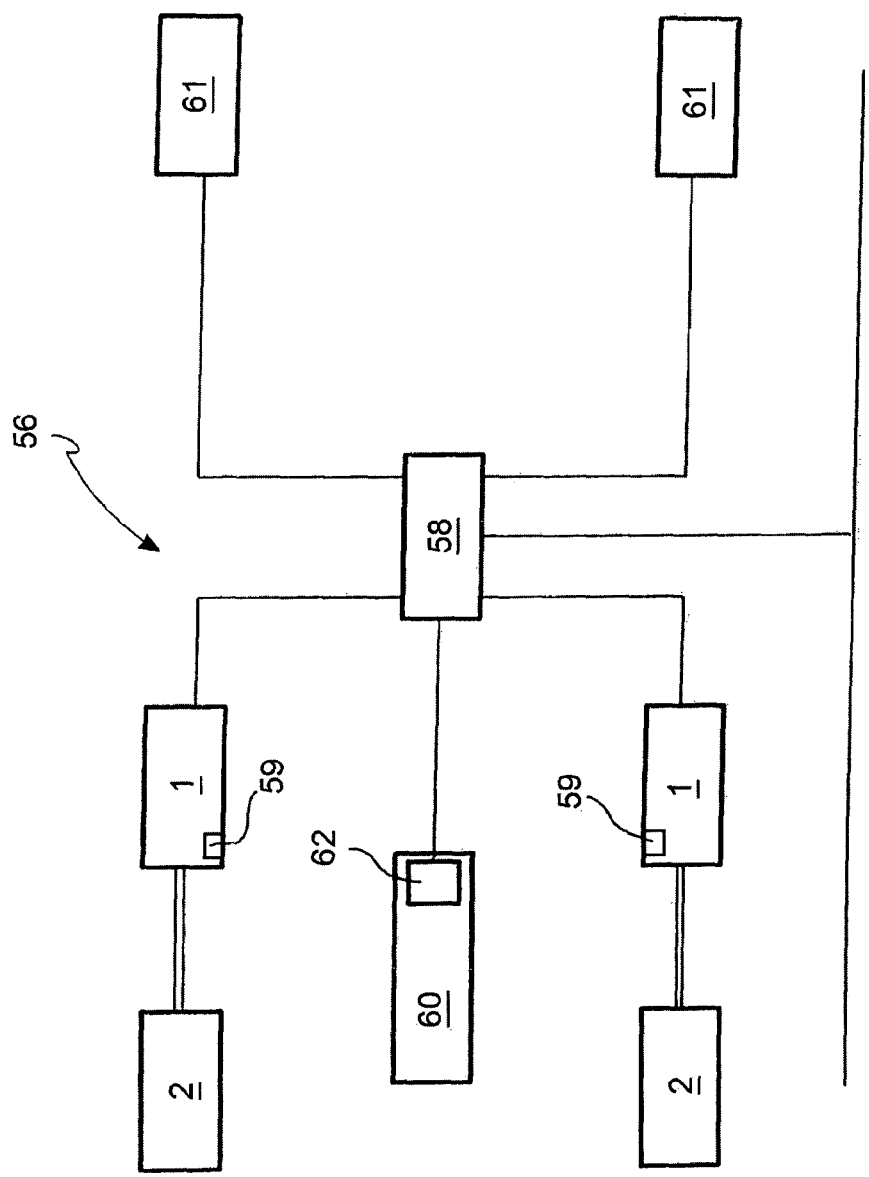
FIG. 11 is a schematic illustration of a braking system of the "Brake By Wire" type, implementing electro-hydraulic actuators according to the invention.

The present invention further relates to a braking system 56 (FIG. 11) comprising a drive member 60, a plurality of hydraulic brakes 2 with hydraulic thrust units (and optionally one or more electro-mechanical brakes 61), in which each hydraulic brake 2 comprises its own electro-hydraulic actuator 1 connected to its own hydraulic thrust unit, and in which a control unit 58 is provided, which is configured to receive and process the required braking torque signals and the pressure signals of each electro-hydraulic actuator 1 and to control in an individual and targeted manner the power supply of each single motor 3 for each of the hydraulic brakes 2 as a function of the required braking torque and the detected fluid pressures.

This allows generating the braking power in an individual and targeted manner for each braked wheel and, when desired, also independently from the braking power required for the other wheels of the vehicle.

This results in the possibility of a targeted and individual optimization of the braking action of every single wheel, for example, under extreme conditions in which an anti-locking modulation (ABS) or curve stabilization of the vehicle (EPS) is required, also independently from the position of the brake pedal.

FIGS. 12 and 13 illustrate two alternative embodiments of the invention.

In accordance with an alternative embodiment (FIG. 12) the converting mechanism 5 may comprise a cam mechanism, for example:

a substantially circular cam 48 rotatably connected to the housing 19 around a cam fulcrum or axis 49 that is eccentric with respect to the center of a circumferential cam surface 50 thereof, said cam 48 being engaged by the reduction unit 22 or directly by the drive shaft 4 so as to be able to apply a torque to the cam 48 and rotate it, a translatable cam follower portion 51 connected to the piston 9 and in engagement with the cam surface 50, in which the cam is shaped so as to obtain the characteristics of transmission ratio and the motor torque-piston stroke dependence as described before with reference to the first embodiment.

In accordance with a further alternative embodiment, the converting mechanism may comprise a rotor 52 coupled with a stator 53 by the engagement between volving members 54 connected to one of them and an helicoidal track 55 formed in the other one, in which the angle (or pitch) of the coil 5 of the helicoidal track 55 varies along the length thereof, so as to obtain the characteristics of transmission ratio and the motor torque-piston stroke dependence as described before with reference to the first embodiment.

In addition to the described advantages, the system according to the invention ensures the reversibility of the motion that is indispensable for the braking systems at issue, it is adapted to a control by means of sensors, and it is characterized by a law of numerically univocal motion and easily numerically simulable, and it reduces the power supply absorption compared to the prior art.

It shall be apparent that to the electro-hydraulic actuator, to the hydraulic brake, and to the braking system according to the present invention, those skilled in the art, in order to meet contingent, specific needs, will be able to make further modifications and variations, all of which are anyhow contained in the protection scope of the invention, as defined by the following claims.

The invention claimed is:

1. An electro-hydraulic actuator for actuating a brake with a hydraulic thrust unit, the actuator comprising:

an electric motor with a drive shaft, a converting mechanism connected with the drive shaft and adapted to convert a rotational motion of the drive shaft into a translational motion of a translatable portion, a cylinder and a piston received in the cylinder and constrained to the translatable portion so as to translate together with respect to the cylinder along a piston stroke extending from a rear end of stroke to a front end of stroke, wherein the piston stroke has a length and comprises:

a front length including the front end of stroke and having a length less than or equal to half the length of the piston stroke, and a rear length including the rear end of stroke and having a length less than or equal to half the length of the piston stroke, a pressure chamber defined by the cylinder and the piston and having a volume that varies as a function of the piston position, from a maximum volume when the piston is at the rear end of stroke position to a minimum volume when the piston is at the front end of stroke position, a supply duct in communication with said pressure chamber and adapted to be connected with the hydraulic thrust unit of the brake, wherein the converting mechanism is configured so that, for a given angular speed of the drive shaft, a translation speed of the piston decreases from a maximum value in a position of the piston in the rear length to a minimum value in a position of the piston in the front length, wherein the converting mechanism comprises a crank and connecting rod mechanism having:

a crank rotatable around a crank axis transversal to a translation axis of the piston, and a connecting rod having a first end hinged to the crank about a hinge axis in an eccentric point relative to the crank axis, a second end forming the translatable portion and permanently engaging a rear portion of the piston, and a length comprising a distance between the first end and the second end, wherein the crank axis is arranged at a perpendicular distance from the translation axis of the piston, wherein said crank has a radius defined as a distance between the crank axis and the hinge axis of the first end of the connecting rod, and said perpendicular distance is less than the radius of the crank, and said perpendicular distance ranges from 0.4L to 0.6L, where L is the length of the connecting rod.

2. The electro-hydraulic actuator according to claim 1, wherein the front length of the piston stroke has a length less than one third, preferably less than one fourth, of the length of the piston stroke.

3. The electro-hydraulic actuator according to claim 1, wherein a minimum value of the transmission ratio ($V_{LIN,9}/V_{ANG, 4}$), expressed as a fraction comprising translation speed of the piston divided by angular speed of the drive shaft, is obtained with a piston at the front end of stroke.

4. The electro-hydraulic actuator according to claim 1, wherein a maximum value of the transmission ratio ($V_{LIN,9}/V_{ANG, 4}$), expressed as a fraction comprising translation speed of the piston divided by angular speed of the drive shaft, is obtained with a piston at the rear end of stroke.

5. The electro-hydraulic actuator according to claim 1, wherein the converting mechanism is configured to produce a non-linear ratio between motor torque and the stroke of the piston, wherein in a prevailing portion of the rear length, the motor torque increases in an approximately linear manner as the piston advances, and, in the front length of the piston stroke, the motor torque has a sub-linear or decreasing trend as the piston advances towards the front end of stroke.

6. The electro-hydraulic actuator according to claim 1, comprising a housing receiving the converting mechanism and supporting the electric motor, and the cylinder, in which the converting mechanism comprises a reduction unit for reducing the rotational motion of the drive shaft and a converting unit for converting the rotational motion into a translational motion.

7. The electro-hydraulic actuator according to claim 1, wherein the crank forms a toothed sector meshing with a pinion of the reducing unit to rotate the crank around the crank axis, said pinion having a radius less than the radius of the toothed sector.

8. The electro-hydraulic actuator according to claim 1, wherein:
with the piston at the rear end of stroke position, the rotational angle of the crank defined as the angle between the translation axis of the piston and the plane defined by the crank axis and the hinge axis of the first end of the connecting rod ranges from 75° to 110°, and
with the piston at the front end of stroke position, said rotational angle of the crank ranges from 3° to 35°.

9. The electro-hydraulic actuator according to claim 1, comprising an elastic return spring connected between the crank and the housing so as to bias the crank to a rest position corresponding to the rear end of stroke position of the piston.

10. The electro-hydraulic actuator according to claim 1, wherein:
the cylinder comprises a connecting flange connected to the housing by means of screws,
the piston is slidably received in the cylinder by the interposition of a first gasket in a front portion of the piston and a second gasket in a rear portion of the piston,
the rear portion of the piston has a rounded cavity receiving in pressing contact and rotatably the translatable portion,
a return spring is arranged with elastic pre-load in the pressure chamber between the cylinder and the piston so as to stress the piston permanently elastically towards the rear end of stroke position,
with the piston in the rear end of stroke position, a suction duct puts the pressure chamber in communication with a reservoir of the pressurized fluid.

11. The electro-hydraulic actuator according to claim 1, comprising:
a control unit to control the supply of the electric motor,
a drive member,
a drive sensor connected to the drive member and in signal communication with the control unit, said drive sensor being configured to generate a required braking torque signal as a function of a shift of the drive member and to transmit the required braking torque signal to the control unit,
a pressure sensor connected to the pressure chamber and in signal communication with the electronic control unit, such pressure sensor being configured to generate a pressure signal as a function of the fluid pressure in the pressure chamber and to transmit the pressure signal to the control unit,
wherein the control unit is configured to receive and process the pressure signal and the required braking torque signal and to control the power supply of the motor as a function of the required braking torque and the detected fluid pressure.

12. A hydraulic brake for a vehicle, comprising a hydraulic thrust unit and an electro-hydraulic actuator according to claim 1.

13. A braking system, comprising:
a plurality of hydraulic brakes with hydraulic thrust units, wherein each hydraulic brake comprises its own electro-hydraulic actuator according to claim 1,
a control unit to control power supplied to the electric motors of said electro-hydraulic actuators,
a drive member and a drive sensor connected to the drive member and in signal communication with the control unit, said drive sensor being configured to generate a required braking torque signal as a function of a shift of the drive member and to transmit the required braking torque signal to the control unit,
wherein a pressure sensor is connected to each pressure chamber, said pressure sensor being in signal communication with the control unit, said pressure sensor being configured to generate a pressure signal as a function of the fluid pressure in the pressure chamber and to transmit the pressure signal to the control unit,
wherein the control unit is configured to receive and process the required braking torque signals and the pressure signals of each electro-hydraulic actuator and to individually control the electrical power supply of each single motor for each of the hydraulic brakes as a function of the required braking torque and the detected fluid pressures.

* * * * *